United States Patent [19]

Gloriod et al.

[11] 3,929,754

[45] Dec. 30, 1975

[54] PROCESS FOR THE PREPARATION OF ETHYLENE POLYMERS BY BOTH FREE-RADICAL AND IONIC POLYMERISATION REACTIONS

[75] Inventors: Pierre Gloriod, Bully-les-Mines; Bernard Levresse, Lillebonne; Jean-Pierre Machon, Bethune, all of France

[73] Assignee: Ethylene Plastique, Courbevoie, France

[22] Filed: Oct. 11, 1973

[21] Appl. No.: 405,653

[30] Foreign Application Priority Data
Oct. 13, 1972 France .............................. 72.36443

[52] U.S. Cl. ... 260/94.9 E; 260/88.2 R; 260/94.9 B; 260/94.9 C
[51] Int. Cl.$^2$ ...................... C08F 4/66; C08F 10/02
[58] Field of Search ....... 260/94.9 B, 94.9 C, 94.9 E

[56] References Cited
UNITED STATES PATENTS

| | | | |
|---|---|---|---|
| 2,953,552 | 9/1960 | Sampa et al.................... | 260/94.9 E |
| 3,058,972 | 10/1962 | Fourcade et al. .............. | 260/94.9 E |
| 3,723,403 | 3/1973 | Greaves et al. ................ | 260/94.9 B |
| 3,732,198 | 5/1973 | Whiteley et al................ | 260/94.9 C |

FOREIGN PATENTS OR APPLICATIONS 853,229  11/1960  United Kingdom

*Primary Examiner*—Edward J. Smith

[57] ABSTRACT

The invention relates to a process for preparing ethylene polymers by polymerising or copolymerising ethylene under conditions such that the ethylene undergoes both free-radical and ionic polymerisation. The process is carried out in a polymerisation reactor under a pressure of at least 1000 bars and at a temperature of 220° to 270°C. in the presence of a catalyst comprising titanium trichloride and/or a titanium alkoxide and an alkylaluminium or alkenylaluminium compound, the dwell time of the catalyst in the reactor being at most 150 seconds. Various procedures are described for adjusting the relative proportions of free-radical polymerisation and ionic polymerisation and of thereby obtaining a wide range of ethylene polymers having differing properties.

1 Claim, No Drawings

PROCESS FOR THE PREPARATION OF ETHYLENE POLYMERS BY BOTH FREE-RADICAL AND IONIC POLYMERISATION REACTIONS

The present invention relates to a process for effecting the simultaneous free-radical and ionic poly-merisation of ethylene.

It is known that ethylene can be polymerised or copolymerised with other ethylenically unsaturated monomers by a free-radical mechanism using a catalyst which generates active free radicals under the polymerisation reaction conditions. A free-radical polymerisation process leads to the production of polyethylenes and ethylene copolymers having well defined characteristics.

It is also known that ethylene can be polymerised or copolymerised with other ethylenically unsaturated monomers, particularly α-olefins, by an ionic mechanism using catalysts of the Ziegler type. The Ziegler catalysts generally consist of a transition metal compound which is activated by organometallic compound such as an alkylaluminum. Their activity can be changed by using suitable additives. An ionic polymerisation process also leads to the production of ethylene polymers having specific characteristics.

It has been proposed to polymerise or copolymerise ethylene under high pressures (that is to say at pressures similar to those used in the free-radical polymerisation of ethylene) by an ionic mechanism using the catalysts generally employed, at lower pressures, for the ionic polymerisation of ethylene. The polyethylenes obtained by the ionic polymerisation of ethylene at high pressures have characteristics (for example density) which are different from those of the polyethylenes which are obtained under the same experimental conditions but employing free-radical generating catalyst.

We have now found that certain catalysts which are known to be suitable for use in the low pressure ionic polymerisation of ethylene are capable, when they are used at high pressures and at certain temperatures, of initiating the simultaneous ionic polymerisation and free-radical polymerisation of ethylene. Since the characteristics of the polymers obtained by an ionic mechanism and by free-radical mechanism are different, and since it is possible to vary the relative proportions of the two types of polymerisation reactions, it is possible to obtain directly ethylene polymers of diverse characteristics and compositions. The ethylene polymers obtained are thus in the form of mixtures of various types of polymer and this makes a valuable selection of certain properties possible.

The invention thus relates to a process for the preparation of ethylene polymers which comprises polymerising or copolymerising ethylene in a polymerisation raction at a pressure of at least 1000 bars and a temperature of 220° to 270°C. in the presence of a catalyst comprising, as component (a), at least one of titanium trichloride and a titanium alkoxide, and, as component (b), an alkyl-aluminum or alkenylaluminum compound, the dwell time of the catalyst in the polymerisation reactor being at most 150 seconds and the conditions of the reaction being such that the ethylene undergoes both free-radical and ionic polymerisation.

The ethylene can, if desired, be copolymerised with an α-olefin, such as propylene or butene.

The alkylaluminum can be, for example, a trialkylaluminum and/or an alkylaluminum alkoxide, a trialkyl-aluminum being preferred when component (a) is titanium trichloride alone. The addition of the catalyst of a complexing agent, such as a silicone oil, changes the behaviour of the catalyst and makes the use of a particular alkyl-aluminum less critical.

By varing the relative amounts of components (a) and (b) of the catalyst, and particularly by varying the atomic ratio of Al to Ti and/or the ratio of titanium alkoxide to titanium trichloride, as well as the reaction conditions of the process of the invention, it is possible to control the relative proportions of ionic polymerisation and of free-radical polymerisation which take place in the reactor.

For a given set of reaction conditions, the relative proportion of free-radical polymerisation increases, all else being equal, when the atomic ratio of Al to Ti and/or the ratio of titanium alkoxide to titanium trichloride increases.

For a given catalyst system, the relative proportion of free-radical polymerisation increases, all else being equal, when the temperature increases and when the dwell time of the catalyst in the reactor increases.

Without going outside the scope of the invention, it is possible to use the various techniques known for carrying out the polymerisation or copolymerisation of ethylene under high pressure. Thus, for example, it is possible to employ tubular reactors or homogeneous stirred reactors; in the latter case, it is possible to use a single reactor inside which the reaction conditions are uniform, or a reactor possessing reaction zones at different temperatures or several consecutive reactors.

The following Examples serve to illustrate the invention. The polymerisation reactions of the Examples were carried out in a uniform stirred reactor. The polyethylenes obtained were characterised by their density (g/cm$^3$), their melt index (or grade) and their relative branching index, which makes it possible to gain an idea of the relative proportions of the two types of polymerisation which gave rise to the product analysed. This index, based on an infra-red measurement of the content of double bonds of the vinylidene type in the polyethylene, is arbitrarily fixed at 100 when the polyethylene has an entirely linear structure (exclusively ionic polymerisation) and 0 when the polyethylene has been prepared by a purely free-radical polymerisation. The density, expressed in g/cm$^3$, is measured at 20°C. on products which have been reheated for 1 hour at 150°C. and cooled at the rate of 50°C/hour. The melt index is measured according to ASTM 1238-62 T, using a temperature of 190°C. and a weight of 2.16 kg.

All the Examples were carried out at a pressure of 1,600 bars, using hydrogen (0.2 to 0.4% by volume) as a transfer agent in certain cases.

EXAMPLES 1 to 6

In these Examples, a catalyst comprising titanium trichloride and a trialkylaluminum was used. Examples 1, 2, 3 and 6 were carried out using violet titanium tri-chloride and triethylaluminum. Example 4 was carried out using titanium tetrachloride and triisoprenylaluminum. Example 5 was carried out using violet titanium trichloride and tri-n-butylaluminum (product of SCHERING A.G.).

The results obtained are given in Table I below:

TABLE I

Violet titanium trichloride activated by a trialkyl-aluminium

| Example | Aluminium compound | Al/Ti atomic ratio | Temperature (°C.) | Dwell time (seconds) | Catalytic yield (g PE/mmol Ti) | Density (g/cm³) | Relative branching index | Melt index |
|---|---|---|---|---|---|---|---|---|
| 1 | AlEt₃ | 5 | 220 | 100 | 1,800 | 0.954 | >98 | 0.05 |
| 2 | AlEt₃ | 5 | 240 | 100 | 1,800 | 0.930 | 27 | 0.4 |
| 3 | AlEt₃ | 5 | 260 | 100 | 2,100 | 0.921 | < 2 | 0.8 |
| 4 | Al-iso-*prenyl₃ | 3.5 | 240 | 65 | 500 | 0.935 | 45 | 10 |
| 5 | Al-(n-Bu)₃ | 5 | 240 | 65 | 1,200 | 0.948 | 80 | 0.77 |
| 6 | AlEt₃ | 3.5 | 240 | 65 | 1,500 | 0.949 | 85 | 0.30 |

*TiCl₄ activated by isoprene

EXAMPLES 7 to 10

In these Examples, the catalyst comprised a titanium alkoxide (or a mixture of titanium alkoxide and titanium trichloride) activated by an alkylaluminum.

The titanium alkoxide used was titanium tetrapropoxide [Ti(OP)₄]. The alkylaluminum used was triethylaluminum in Example 7, and diethylaluminum chloride in Examples 8, 9 and 10.

In Example 7, the titanium tetrapropoxide was used alone, but in Example 8, 9 and 10 a mixture of titanium tetrapropoxide and titanium trichloride was used, the mixture having a molar ratio of tetrapropoxide to trichloride of 1:2 in Example 8, 1:4 in Example 9 and 1:8 in Example 10.

The results obtained are given in Table II below:

EXAMPLES 11 to 15

In these Examples, a catalyst was used comprising violet titanium trichloride, diethylaluminum chloride and dimethyl-silicone oil.

The results obtained are given in Table III below:

TABLE III

Titanium trichloride activated by AlEt₂Cl in the presence of a complexing agent (silicone oil)

| Example | Temperature (°C.) | Dwell time (seconds) | Catalytic yield (g PE/mmol Ti) | Density (g/cm³) | Relative branching index | Melt index |
|---|---|---|---|---|---|---|
| 11 | 240 | 100 | 1,300 | 0.949 | 80 | 0.017 |
| 12 | 240 | 110 | 1,900 | 0.947 | 75 | 0.012 |
| 13 | 240 | 135 | 1,300 | 0.935 | 40 | 0.12 |
| 14 | 260 | 120 | 1,200 | 0.922 | 0 | 5.3 |
| 15* | 260 | 110 | 1,400 | 0.923 | 0 | 1.2 |

15*silicone oil/TiCl₃ = 0.6 mol/mol instead of 0..3 mol/mol for Examples 11 to 14

We claim:

1. A continuous process for the preparation of ethylene polymers by polymerisation or copolymerisation of ethylene in a polymerisation reactor at a pressure of at least 1000 bars and at a temperature of from 220° to 270° C. in the presence of a catalyst of the Ziegler type, the dwell time of the catalyst in the reactor being not more than 1.50 seconds, the catalyst comprising an organic compound of aluminum selected from the group consisting of trialkylaluminum and diethylaluminum chloride; and titanium trichloride and a titanium tetrapropoxide, the relative ratio of titanium tetrapropoxide to titanium trichloride being between 1:2 and 1:8 moles for controlling the relative degree of free radical polymerisation and ionic polymerisation.

* * * * *

TABLE II

Mixtures of titanium alcoholate and titanium trichloride activated by an alkylaluminium

| Example | Component (a) | | Temperature (°C.) | Dwell time (seconds) | Catalytic yield (g PE/mmol Ti) | Density (g/cm³) | Relative branching index | Melt index |
|---|---|---|---|---|---|---|---|---|
| 7 | Ti(OPr)₄ | | 260 | 140 | 1,600 | 0.923 | <2 | 3 |
| 8 | Ti(OPr)₄/TiCl₃ | = 1 mol / 2 mol | 260 | 100 | 1,000 | 0.942 | 60 | 0.02 |
| 9 | Ti(OPr)₄/TiCl₃ | = 1 mol / 4 mol | 260 | 100 | 1,100 | 0.948 | 80 | 0.1 |
| 10 | Ti(OPr)₄/TiCl₃ | = 1 mol / 8 mol | 260 | 30 | 1,700 | 0.966 | 100 | 2.0 |

UNITED STATES PATENT AND TRADEMARK OFFICE
CERTIFICATE OF CORRECTION

PATENT NO. : 3,929,754
DATED : December 30, 1975
INVENTOR(S) : Pierre Gloriod et al It is certified that error appears in the above-identified patent and that said Letters Patent are hereby corrected as shown below:

Claim 1, line 7, change "1.50 seconds" to --150 seconds--.

Signed and Sealed this

Eleventh Day of May 1982

[SEAL]

Attest:

GERALD J. MOSSINGHOFF

Attesting Officer   Commissioner of Patents and Trademarks